Sept. 7, 1926.                H. E. TOLLE ET AL                 1,599,105
                           LIQUID DISCHARGE MEANS
                           Filed Dec. 15, 1924         2 Sheets-Sheet 1
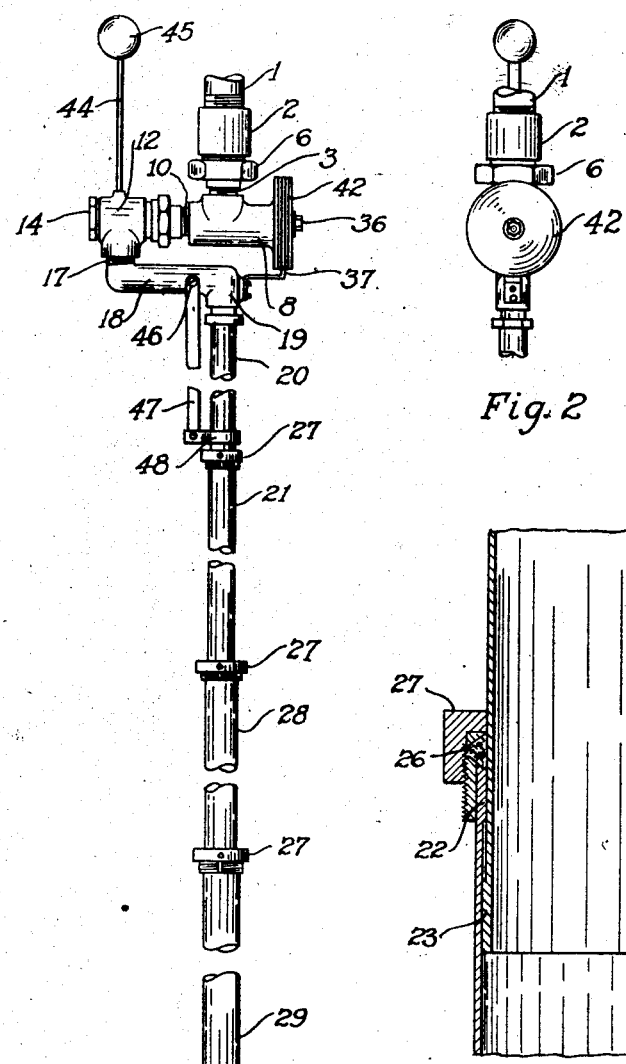
Fig. 1
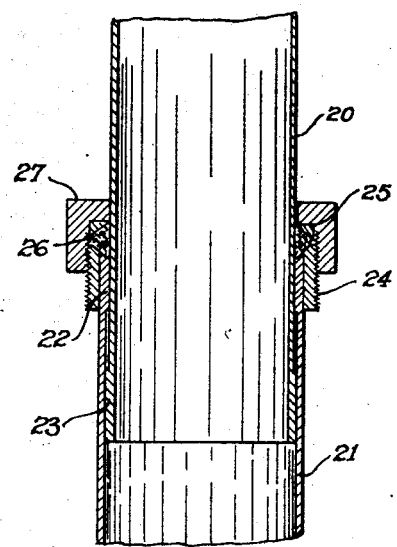
Fig. 2
Fig. 3
INVENTORS
Howard E. Tolle and
Zemer A. Tolle,
BY
Howard P. Smith,
Their ATTORNEY Sept. 7, 1926.
H. E. TOLLE ET AL
1,599,105
LIQUID DISCHARGE MEANS
Filed Dec. 15, 1924      2 Sheets-Sheet 2
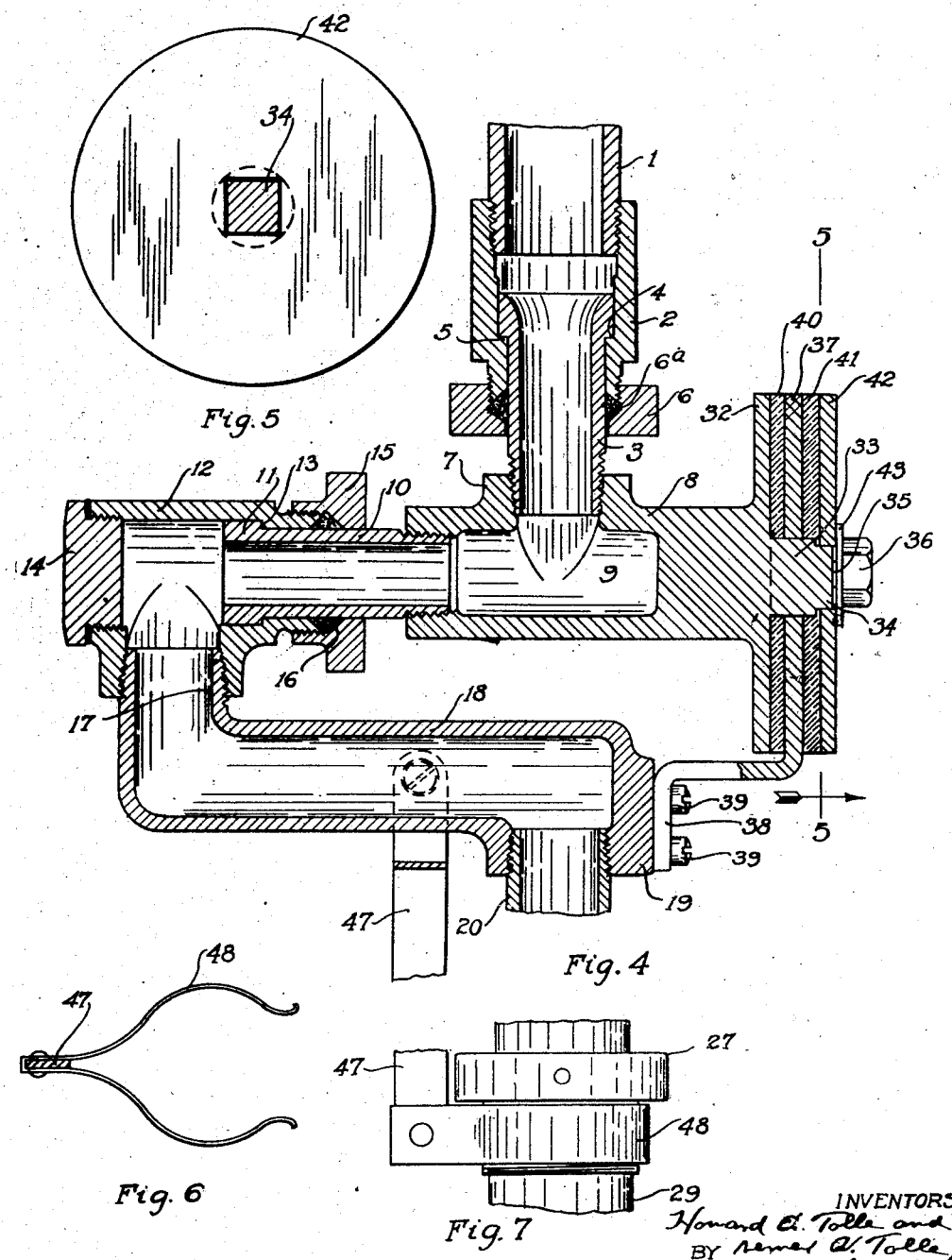

Patented Sept. 7, 1926.

1,599,105

UNITED STATES PATENT OFFICE.

HOWARD E. TOLLE AND VERNER A. TOLLE, OF DAYTON, OHIO.

LIQUID-DISCHARGE MEANS.

Application filed December 15, 1924. Serial No. 756,065.

This invention relates to new and useful improvements in liquid discharge means.

It is the principal object of our invention to provide for liquid delivery use, and more particularly for such service in gasoline and oil filling stations, a plural jointed and telescopic tubular apparatus which is self draining. The present type of hose used in gasoline filling stations must be raised before a delivery operation is complete, to drain into the automobile filling tank the liquid fuel which has been trapped in its bends. If it is not raised high enough, or maintained in its elevated position long enough, the delivery hose will retain some of the liquid fuel to which the customer is entitled.

Our plural jointed, telescopic device, on the other hand, is not only self draining to deliver to a customer all the liquid fuel to which he is entitled, but it may be easily adjusted to the desired angle, and extended a sufficient degree, to properly fill the tank of an automobile irrespective of the latter's position with respect to the pump.

Our liquid discharge means may be economically constructed and easily attached to the outlet tube of a gasoline or other fluid pump or tank.

In the accompanying drawings, Figure 1 is a side elevational view of our liquid discharge apparatus. Figure 2 is a side elevational view of the universal joint portion of the device. Figure 3 is an enlarged, sectional view of the telescopic ends of two of the delivery tube sections. Figure 4 is a longitudinal, sectional view taken through the device. Figure 5 is a cross sectional view taken on the line 5—5 of Figure 4. Figure 6 is a plan view of the means which we prefer for holding the telescopic tubes in their contracted positions. And Figure 7 is a side view of said holding means.

Referring to the accompanying drawings, the numeral 1 designates a discharge tube on a fluid pump or tank (not shown). The tube 1 is exteriorly threaded at its lower end to receive an internally threaded coupling sleeve 2 by which there is connected to the tube 1, an intermediate tube 3. The latter is formed with an external annular shoulder 4 which is engaged by an annular internal shoulder 5 on the coupling sleeve 2 that is externally threaded at its lower end to receive a nut 6. The lower wall of the coupling sleeve 2 is beveled inwardly to form with an enlarged cavity within the nut, an annular space to receive suitable packing material 6ª which is pressed against the outer surface of the tube 3 when the nut 6 is screwed onto the coupling sleeve, to effect a liquid tight connection between the tubes 1 and 3. (See Figures 1, 2 and 4.)

At its outer end the tube 3 is exteriorly threaded for entrance into a threaded boss 7 on a cylindrical casting 8 into which there is preferably drilled from one end, a hole 9 that communicates with the outer end of the tube 3 through the boss 7. The inner end of the casting 8 is internally threaded around the hole 9 to receive the externally threaded end of a tube 10 that is formed at its outer end with an external annular shoulder 11. Before the tube 10 is screwed into the casting 8, it is forced through a T 12 until its shoulder 11 engages an annular shoulder 13 formed within the T. Threaded into the outer end of the cross portion of the T 12 is a cap nut 14, while there is applied to its inner end, which is externally threaded, a sleeve nut 15 to press suitable packing material 16 against the inner edge of the T and the external surface of the tube 10, to effect a liquid tight connection between the latter and the T. (See Figures 1 and 4.)

Threaded into the side outlet of the T 12 is one right-angled end 17 of a tubular casting 18 which is in substantial parallelism with the casting 8. The casting 18 is formed, preferably in radial alinement with the boss 7, with a right-angled bend 19 that is tapped to receive the inner end of a tube 20. The outer end of this tube 20 telescopes into a tube 21, the inner wall of which is formed with an annular enlargement 22 which is adapted to be engaged by an annular shoulder 23 formed on the outer end of the tube 20 to prevent the tube 21 from being pulled off of it. (See Figures 1 and 3.)

Surrounding the inner end of the tube 21 is an exteriorly threaded sleeve 24 whose inner edge is chamfered. Between this sleeve 24 and a gland 25 beyond it, is suitable packing 26 which is adapted to be pressed against the tube 20 by the gland when a sleeve nut 27 is screwed onto the sleeve. (See Figure 3.) A liquid tight connection is thus formed between the telescopic tubes 20 and 21 without interfering with the axial movement of the tube 21 over the tube 20.

The tube 21 is telescopically connected in a similar manner to a tube 28, and the latter in a like manner to a tube 29. Secured in a liquid tight manner to the outer end of the tube 29 is a short piece of flexible tubing 30 to whose outer end a nozzle 31 is secured. (See Figure 1.)

Formed on the closed end of the casting 8, is a wide flange 32. Axially projecting beyond the latter from the casting 8 is a cylindrical extension 33 terminating in a squared reduced portion 34. (See Figures 4 and 5.) The extension 33 ends beyond its squared portion in a reduced round end 35 which is externally threaded to receive a nut 36. (See Figure 4.)

Free to revolve upon the axial projection 33, is a metal disc 37 which is formed at its inner end with an extension that is turned to provide a part 38 parallel with its disc part for attachment by suitable fastening elements such as screws 39, 39, to the end surface of the bend 19 of the casting 18. Between the disc 37 and the flange 32 on the casting 8, is a friction disc 40, preferably constructed of fiber, while a similar disc 41 is placed between the outer face of the metal disc 37 and a metal disc 42 applied to the squared portion 34 of the extension 33 of the casting. (See Figure 4.)

Mounted on the end 35 of the casting extension 33 is a washer 43 which is adapted to be engaged by the nut 36 to press the disc 42, with the desired degree of tension, against the remaining discs and the flange 32 on the casting to control the frictional resistance which the fiber discs 40 and 41 offer to the rotation of the metal disc 37 on the casting extension 33.

Referring to Figure 1, there is secured to the T 12, opposite its side outlet, an arm 44 which carries on its outer end a counterweight 45 for the purpose of balancing the telescopic delivery tube unit. However, this counterweight may be dispensed with if desired.

Pivotally secured by a screw 46 to the middle portion of the casting 8, is an arm 47 to the outer end of which there is secured a spring-fork clamping member 48 which is adapted to be applied to the tube 29 below the sleeve nut 27 on its inner end, to hold the telescopic tubes in their nested positions. (See Figures 1, 4, 6 and 7.)

The tube 3 is free to revolve within the coupling 2, to enable our delivery device to be turned about the axis of the pump outlet tube 1. With the T 12 free to be revolved about the tube 10, and the metal disc 37 free to be turned around the casting extension 33, the telescopic delivery tube unit may be raised and lowered when desired. This telescopic delivery tube unit, being balanced by the counterweight 45, may be easily raised and lowered by a filling station attendant, and held in an adjusted position by the frictional resistance offered to the rotation of the metal disc 37 by the fiber discs 40 and 41. Furthermore, the telescopic tubular unit may be easily extended or contracted to bring the nozzle 31 directly over the opening in an automobile tank, into which the full amount of liquid fuel drawn from the pump will flow, since there are no pockets in our device to trap it.

Having described our invention, we claim:—

1. Liquid discharge means comprising a pump outlet tube, a horizontal tubular structure pivotally connected near its middle portion to said pump outlet tube, a second tubular structure communicating with, and rotatable about, one end of the horizontal tubular structure, and a pivotal braking connection between the second tubular structure and the other end of the horizontal tubular structure.

2. Liquid discharge means comprising a pump outlet tube, a horizontal casting open at one end, means for connecting the casting to said tube, a tubular structure connected to the open end of said casting for rotation about its longitudinal axis, a disc member rotatably secured to the other end of said casting and having an extension fixedly secured to the tubular structure, a friction disc on each side of the disc member, and means on the casting for pressing the friction discs against the disc member for the purpose specified.

3. Liquid discharge means comprising a pump outlet tube, a right-angled tubular structure connected to said tube, a second tubular structure communicating with, and rotatable about, the first tubular structure, a braking connection between the first and second tubular structures, and a counterweight on the second tubular structure to assist its movement about the first tubular structure against the opposition of said braking connection.

In witness whereof we have hereunto set our hands this 11th day of December, 1924.

HOWARD E. TOLLE.
VERNER A. TOLLE.